Jan. 16, 1962 N. E. POLSTER 3,017,560

TRANSISTOR SWITCHING CIRCUITS

Filed Oct. 1, 1958 2 Sheets-Sheet 1

United States Patent Office 3,017,560

Patented Jan. 16, 1962

3,017,560

TRANSISTOR SWITCHING CIRCUITS

Norman E. Polster, Southampton, Pa., assignor to Leeds and Northrup Company, Philadelphia, Pa., a corporation of Pennsylvania Filed Oct. 1, 1958, Ser. No. 764,585
6 Claims. (Cl. 321—45)

This invention relates to transistor switching circuits, and has for an object the provision of a system in which there is provided not only compensation for voltage offset of the transistor during its operation as a switch but also compensation for the temperature coefficient of the transistor.

Transistors have heretofore been used as switches and it has been recognized that while they are useful for the stated application, they have voltage offset characteristics, that is to say, that when the transistor is in its conductive state, the transistor itself acts as a source of voltage. In addition, transistors have temperature coefficients which produce a change in the action of the transistor as a source of voltage.

It is an object of the present invention to provide a transistor switching circuit in which there is compensation for both the voltage offset of the transistor and variations in the action of the transistor as a source of voltage due to change in temperature of the transistor.

In a preferred form of the invention, the transistor is of the type in which its current offset produces a negligible voltage effect at the terminals of the external circuits, that is to say, a transistor which when non-conductive acts as a current source of limited magnitude. Silicon transistors are representative of the type to which the present invention is particularly applicable.

In carrying out the invention in one form thereof, the control signal utilized to turn the transistor on and off is utilized through a compensating network to develop in the output circuit a voltage equal and opposite to that due to the transistor acting as a voltage source during the time it is conductive and also to compensate in voltage variations arising from change in the temperature of the transistor when acting as a voltage source.

Figure 1:
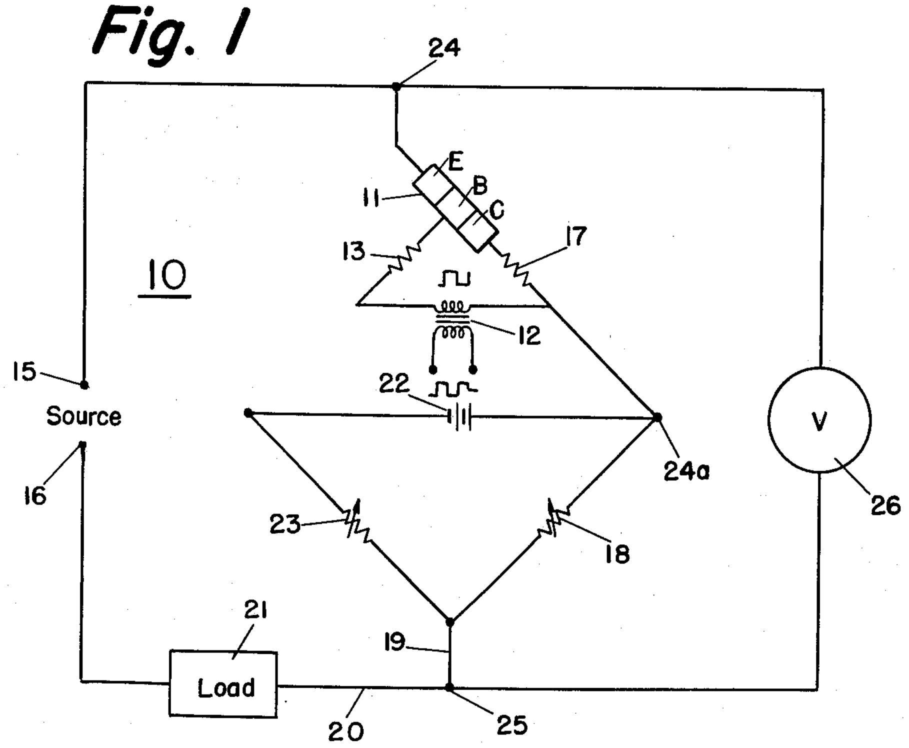

For further objects and advantages of the invention, and for a description of its operation, reference is to be had to the following detailed description taken in conjunction with the accompanying drawings in which:

FIG. 1 schematically illustrates a transistor compensating circuit; and

Figure 2:
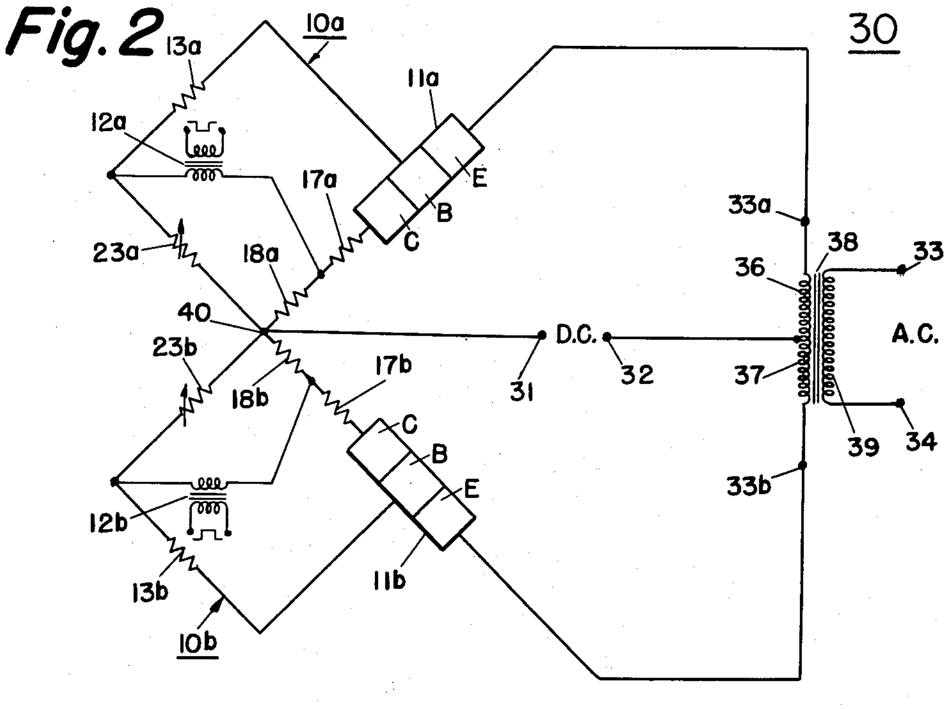
Figures 3, 4:
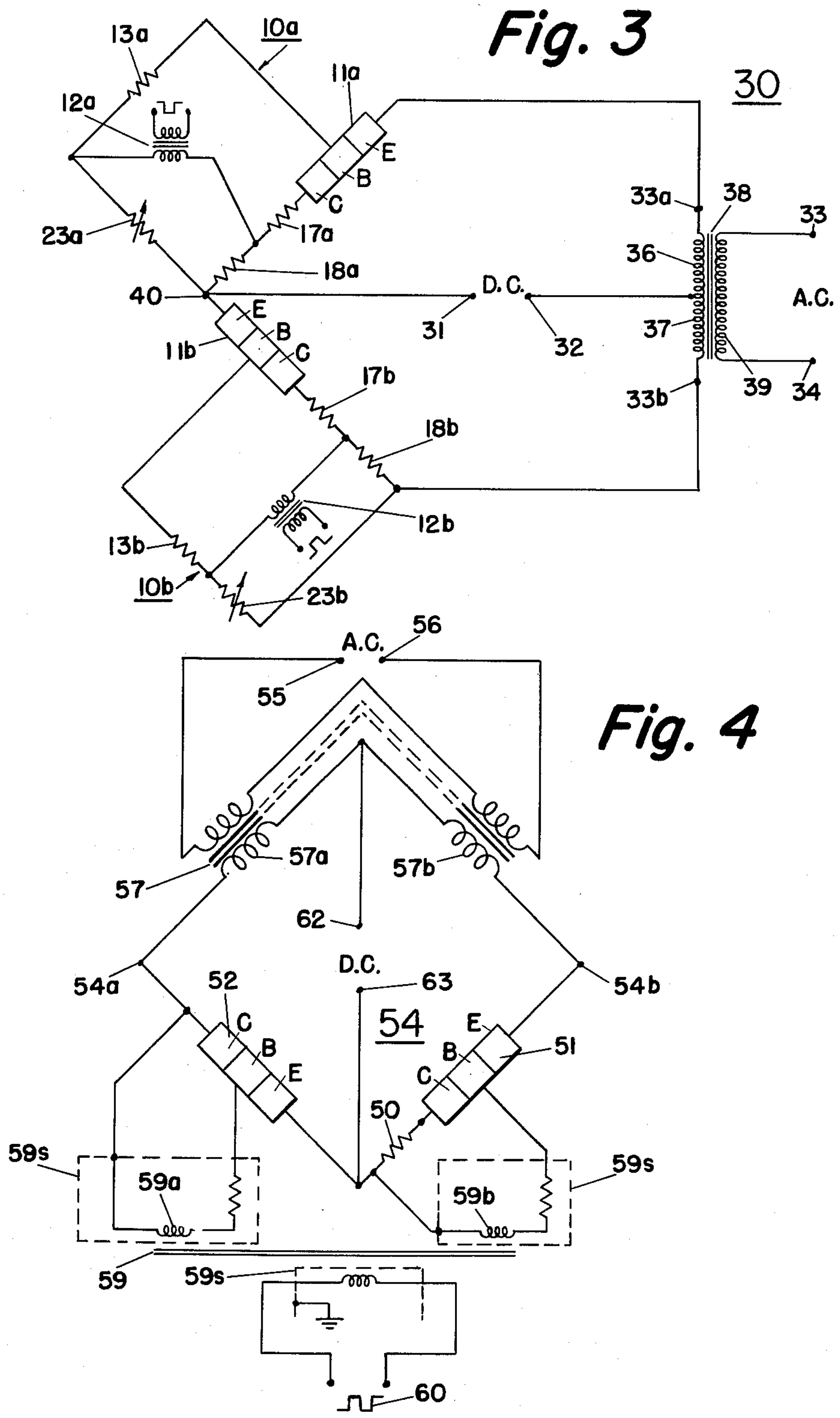

FIGS. 2–4 illustrate modifications of the invention as applied to converters suitable for operation as either modulators or demodulators.

According to FIG. 1, the compensating circuit 10 has been illustrated as including a transistor 11 having a control circuit connected between two control electrodes such as the base and collector and including a transformer 12, the primary winding of which has applied to it an alternating current voltage preferably of the square-wave type for turning on and off the transistor. The square-wave is preferred to obtain better efficiency, a minimum of noise at the output terminals at twice the square-wave frequency, and to reduce the spurious effects of the transistor during the switching between conduction and non-conduction. A resistor 13 is included in the control circuit to limit the magnitude of the base current. If it be assumed that a positive voltage pulse turns on the transistor 11, that is, makes it conductive, then current can flow from input terminals 15 and 16 by way of transistor 11, resistors 17 and 18 and conductors 19 and 20 to the load 21. Either a direct current or an alternating current source of voltage may be connected to terminals 15 and 16 since the transistor 11, when conductive, will conduct in both directions.

When transistor 11 is conductive, it acts as a voltage source and thus introduces into the output circuit a voltage which in many applications of the invention is quite disadvantageous. In order to compensate for the action of the transistor 11 as a voltage source, there is provided a compensating circuit which includes a source such as a battery 22 and a resistor 23. Current flows from the battery or source 22 through a closed circuit including resistors 18 and 23. The direction of current flow through resistor 18 is in a direction to produce a potential difference across resistor 18 which between points **24*a* and 19 is equal and opposite to the voltage developed between points 24 and 24*a* due to the action of the transistor 11 as a voltage source. In this manner, there is avoided in the circuit controlled by the transistor the appearance of any voltage due solely to the action of the transistor as a voltage source. Thus, the voltage-responsive device 26 connected to points 24 and 25 will read zero so long as transistor 11 is conductive and the "source" at terminals 15, 16** is zero.

It will be observed that there is included in series with the collector electrode of transistor 11 a resistor 17. The compensating circuit, including resistor 18, introduces a voltage which not only compensates for that due to the action of transistor 11 as a voltage source but also due to the potential drop across resistor 17. The resistor 17 is included in series with the collector electrode of the transistor 11 in order to provide temperature compensation for the temperature coefficient of resistance, the resistor 17 will be of material having a positive temperature coefficient of resistance, such as nickel or copper, and its physical location will preferably be in intimate physical contact with the transistor. The resistor 17 may be wrapped around the transistor though electrically insulated therefrom. The resistors 18 and 23 have values for producing the compensating action described above. In practice, the resistor 18 will be a precision resistor and the resistor 23 will be adjustable. If desired, resistor 18 may be selected to have a temperature coefficient of resistance to perform the compensation above described for resistor 17.

It will now be assumed that a negative control pulse applied by transformer 12 renders the transistor 11 non-conductive. It will be noted that while current still flows through resistor 18, the potential difference across that resistor does not appear between points 24 and 25 of the output circuit. That circuit is open since transistor 11 is then non-conductive.

The system of FIG. 1 has usefulness in many applications, particularly where the transistor 11 is to be operated rapidly to open and close the circuit. It may be operated at a frequency limited only by the quality of the square-wave at the higher frequency and the response characteristics of the transistor. In practice, silicon transistors of the type 2N496 (Philco) can operate at frequencies at least as high as 25 megacycles per second. However, converter applications will be below the megacycle range.

In the system of FIG. 2 the invention has been illustrated as applied to a converter 30 which may function either to convert alternating current to direct current or direct current to alternating current. The direct current circuit will be connected to direct current terminals 31 and 32 and the alternating current circuit connected to the terminals 33 and 34. Two transistors **11*a* and 11*b*** each have associated with them compensating circuits of the type illustrated in FIG. 1. In FIG. 2, the control voltage for the respective transistors is utilized not only alternately to turn on one and to turn off the other, and vice versa, but also to develop the compensating voltage to render ineffective in either of the external circuits the effects of voltage offset of each transistor.

In FIG. 2, the circuit components forming the compensating circuit for the respective transistors 11*a* and 11*b* have been given the same reference characters as the corresponding components in FIG. 1 with subscrips "*a*" added to the reference characters associated with transistor 11*a* and subscripts "*b*" added to the reference characters associated with the transistor 11*b*. The pair of transistors 11*a* and 11*b* is included in a bridge circuit. The bridge circuit includes in two adjacent arms thereof, coils 36 and 37 shown as opposite halves of a transformer winding of a transformer 38, the associated magnetically coupled winding 39 being connected to the external alternating current circuit at terminals 33 and 34. The external direct current circuit extends from the juncture between coils 36 and 37, which juncture forms one end of one diagonal of the bridge, the other end of that diagonal terminating at point 40. The effect upon either external circuit 31, 32 or 33, 34 of any voltage offset or current offset of the transistors is avoided.

In accordance with the present invention, each of the compensating circuits 10*a* and 10*b* introduces respectively by way of resistors 18*a* and 18*b* voltages which are effective at terminals 33*a*, 33*b* of the bridge to compensate for the effect of each transistor as a voltage source during the time it is conductive. This compensation is attained by reason of the fact that when the transformer 12*a* is energized with an instantaneous polarity in a direction to turn on transistor 11*a*, current from the secondary winding of that transformer flows through the circuit including resistor 18*a* and resistor 23*a* in the direction to introduce the compensating or opposing voltage. The action is identical for the compensating circuit 10*b*. While separate transformers 12*a* and 12*b* have been illustrated, it is to be understood that these transformers may be a single unit, that is to say, having a single primary winding and two secondary windings which cooperate upon each half-cycle applied to the primary winding concurrently to turn one transistor on and to turn the other transistor off.

Assuming now that the transistor 11*a* is non-conductive while transistor 11*b* is conductive, it will be noted that the potential difference appearing across resistor 18*a* will be ineffective on either of the external circuits since transistor 11*a* is non-conductive. The same situation applies when transistor 11*b* is non-conductive and transistor 11*a* is conductive.

The system of FIG. 2 will, in general, be suitable for high level operation, that is, in the range of about 1,000 times the voltage offset where the accuracy of the system is to be 0.1%. For lower levels of operation and in systems where over a period of time the offsets of the transistors may not vary at a uniform rate and/or by equal amounts in respect to time and where the offsets will vary with time, the arrangement of FIG. 3 will be preferred.

The system of FIG. 3 includes features disclosed and claimed in a copending application, Serial No. 764,705, filed October 1, 1958, by Albert J. Williams, Jr., a co-employee of mine, said application being assigned to the same assignee as the present invention. In the system of FIG. 3 and as explained in said Williams application, where the effect of offset around the bridge is the same as produced by both of the transistors, the external direct current circuit will be across the diagonal including the point 40 which is common to the two transistors. In FIG. 3, the offsets are in the same direction around the bridge by reason of the fact that one of the transistors, the transistor 11*b*, in FIG. 3, is reversed relative to its connection in FIG. 2. By reason of the reversal of the disposition of transistor 11*b* in the arm of the bridge 30, it will be observed that the compensating circuit 10*b* has been moved from its location in FIG. 2, but its action in FIG. 3 is the same as described above. Briefly, the operation of the system of FIG. 3 is such that any uncompensated offsets of transistors 11*a* and 11*b* produce at the external direct current terminals 31, 32 an alternating current potential; and at the output terminals 33*a* and 33*b* of the bridge, a direct current potential. The effect is the same for current offset present in either of transistors 11*a* and 11*b*. Hence, in the system of FIG. 3 thus far described it will be seen that either silicon transistor may be utilized, or germanium transistors, the latter having appreciable current offset as well as appreciable voltage offset.

Referring now to FIG. 4, there has been added to another of the modifications of said Williams application, Serial No. 764,705, an improvement in accordance with the present invention, and particularly the addition of a resistor 50 in series with the collector electrode of a transistor 51 connected in one arm of the bridge. A transistor 52 is connected in an adjacent arm of the bridge with the respective control electrodes of the transistors suitably labeled E, B and C to refer to the emitters, the bases and the collectors respectively.

The bridge 54 comprises a converter suitable for modulating or demodulating applied signals. It includes terminals 55 and 56 of an external alternating current circuit which by coupling transformer 57 is effectively connected across the diagonal 54*a*, 54*b* of the bridge converter 54. The windings 57*a*, 57*b* of transformer 57 form impedance elements connected in the opposite arms of the bridge from transistors 51 and 52. The control circuits for the transistors 51 and 52 are formed by the secondary windings of transformer 59, the primary winding being energized from a suitable alternating current source of supply which is preferably of the square-wave type as illustrated by the input signal 60. The control transformer 59 is of the double-shielded type, that is to say, each of the secondary windings 59*a* and 59*b* is provided with separate shields as indicated by the broken lines 59*s* respectively connected to the side of the transformer winding which extends to the collector electrodes of the respective transistors. The primary winding of the transformer is provided with a shield 59*s* which is connected to ground as indicated by the ground-symbol. As explained in said Williams application, the effects of offsets of transistors 51 and 52 do not affect the external circuits including alternating current terminals 55 and 56 and direct current terminals 62 and 63 where the magnitudes of the offsets are the same for the two transistors 51 and 52.

In accordance with the present invention and where the transistors 51 and 52 are of the silicon type, the transistors 51 and 52 need not be matching; one may have a greater offset than the other. In the circuit in series with the collector electrode of the transistor having the lesser voltage offset, there may be attained compensation for the differing offset as between the two transistors. For transistors, one of which had a voltage offset of 800 microvolts and the other an offset of 500 microvolts, a resistor of 0.8 ohm in the collector lead of the transistor having 500 microvolts was found to be effective to bring the two transistors to matching relationship for complete elimination on the bridge converter 54 of the effects of offset. The resistor material for resistor 50 will be selected for a temperature coefficient which maintains the aforesaid compensation over a wide temperature range, as for example, from 13° C. to 64° C. A portion of the resistor 50 may be composed of copper for the aforesaid silicon transistors with the remainder of that resistor of manganin.

While a preferred embodiment of this invention has been illustrated, it is to be understood that other modifications thereof may be made within the scope of the appended claims.

What is claimed is:

1. In combination, a transistor having a control circuit connected to two control electrodes thereof for turning said transistor on and for turning it off, a temperature-compensating resistor in series with the collector electrode of said transistor having temperature coefficient of resistance approximately equal to that of said transistor and of opposite sign, said temperature-compensating resistor being disposed close to said transistor so that its temperature will at all times closely approximate that of said transistor, compensating means for developing a compensating voltage equal and opposite to the sum of the potential difference developed across said temperature-compensating resistor when said transistor is conductive and the voltage developed by said transistor due to its action as a voltage source when conductive, said compensating means including a source of voltage, a compensating resistor in series with said transistor, and a circuit for flow of current from said source through said compensating resistor in a direction to develop said compensating voltage.

2. The combination of claim 1, forming at least one arm of a bridge circuit including impedance elements in the remaining arms thereof, a direct current external circuit connected across one diagonal of the bridge and an alternating current external circuit connected across the opposite diagonal of the bridge.

3. The combination of claim 1, duplicated to form two adjacent arms of a bridge circuit including impedance elements in the remaining arms thereof, a direct current external circuit connected across one diagonal of the bridge and an alternating current external circuit connected across the opposite diagonal of the bridge.

4. In a full-wave converter comprising a bridge circuit having first and second transistors respectively in two adjacent arms, an impedance element in each of the remaining arms, control circuits respectively connected to control electrodes of said transistors for controlling their conductivity, means for applying an alternating control voltage to each of said control circuits for cyclically rendering said first transistor conductive and said second transistor non-conductive and for then rendering said second transistor conductive and said first transistor non-conductive, an external direct current circuit effectively connected across one diagonal of said bridge, and an external alternating current circuit effectively connected across the opposite diagonal of said bridge, the improvement comprising means for compensating the effects of voltage offsets of said transistors including resistance means in series with the collector electrode of at least one of said transistors and of magnitude for development of a compensating potential difference which reduces to zero as a limit the current flow due to said voltage offsets of said transistors, said resistance means being at least in part of a material having a temperature coefficient of resistance which maintains compensation for said voltage offsets over a wide temperature range.

5. The converter of claim 4 in which said resistance means includes compensating resistors in series with the collector electrode of each of said transistors, said compensating resistors having magnitudes for development of compensating potential differences which reduce to zero as a limit the current flow due to the voltage offsets in each of said transistors.

6. The converter of claim 5 in which said resistance means includes a temperature-compensating resistor in series with the collector electrode of each of said transistors, each said temperature-compensating resistor having a temperature coefficient of resistance approximately equal to the temperature coefficient of resistance of its respective transistor and of opposite sign whereby said compensating potential difference is equal and opposite to the sum of the potential difference developed across said temperature-compensating resistor when its respective transistor is conductive and the voltage offset developed by that transistor.

References Cited in the file of this patent

UNITED STATES PATENTS

| | | |
|---|---|---|
| 2,693,572 | Chase | Nov. 2, 1954 |
| 2,783,380 | Bonn | Feb. 26, 1957 |
| 2,783,384 | Bright et al. | Feb. 26, 1957 |
| 2,862,109 | Kruper | Nov. 25, 1958 |
| 2,862,171 | Freeborn | Nov. 25, 1958 |
| 2,888,627 | Kompelien et al. | May 26, 1959 |

UNITED STATES PATENT OFFICE

CERTIFICATE OF CORRECTION

January 16, 1962

Patent No. 3,017,560

Norman E. Polster

It is hereby certified that error appears in the above numbered patent requiring correction and that the said Letters Patent should read as corrected below.

Column 2, line 29, after "coefficient" insert -- of the transistor 11. Thus, for a transistor having a negative temperature coefficient --.

Signed and sealed this 24th day of July 1962.

(SEAL)
Attest:

ERNEST W. SWIDER
Attesting Officer

DAVID L. LADD
Commissioner of Patents